(12) United States Patent
Suminto et al.

(10) Patent No.: US 8,146,436 B2
(45) Date of Patent: Apr. 3, 2012

(54) SILICON SENSING STRUCTURE TO DETECT THROUGH-PLANE MOTION IN A PLANE OF MATERIAL WITH THERMAL EXPANSION SUBSTANTIALLY DIFFERENT FROM THAT OF SILICON

(75) Inventors: James Tjan-Meng Suminto, West Covina, CA (US); Leslie Bruce Wilner, Palo Alto, CA (US)

(73) Assignee: Meggitt (San Juan Capistrano), Inc., San Juan Capistrano, CA (US)

( * ) Notice: Subject to any disclaimer, the term of this patent is extended or adjusted under 35 U.S.C. 154(b) by 850 days.

(21) Appl. No.: 12/239,985

(22) Filed: Sep. 29, 2008

(65) Prior Publication Data

US 2009/0139338 A1   Jun. 4, 2009

Related U.S. Application Data

(60) Provisional application No. 60/976,206, filed on Sep. 28, 2007.

(51) Int. Cl.
*G01L 9/06* (2006.01)
(52) U.S. Cl. .............................. 73/727; 73/715; 73/721
(58) Field of Classification Search .................. None
See application file for complete search history.

(56) References Cited

U.S. PATENT DOCUMENTS

| | | | |
|---|---|---|---|
| 4,862,317 A * | 8/1989 | Kuisma .................... | 361/283.1 |
| 5,088,329 A | 2/1992 | Sahagen | |
| 5,167,158 A * | 12/1992 | Kamachi et al. ............... | 73/727 |
| 5,271,277 A | 12/1993 | Pandorf | |
| 5,331,857 A | 7/1994 | Levine et al. | |
| 5,744,725 A * | 4/1998 | Chen et al. ..................... | 73/724 |
| 6,003,380 A * | 12/1999 | Sasaki et al. ................... | 73/720 |
| 6,062,088 A * | 5/2000 | Ingrisch et al. ................ | 73/727 |
| 6,122,976 A * | 9/2000 | Hallberg et al. ............... | 73/756 |
| 6,351,996 B1 * | 3/2002 | Nasiri et al. ................... | 73/706 |
| 6,561,037 B2 * | 5/2003 | Bohler et al. .................. | 73/715 |
| 6,877,380 B2 * | 4/2005 | Lewis ............................ | 73/715 |
| 7,000,478 B1 * | 2/2006 | Zwollo et al. ................. | 73/708 |
| 7,152,478 B2 * | 12/2006 | Peterson et al. ............... | 73/715 |
| 7,584,665 B2 * | 9/2009 | Kurtz et al. ................... | 73/721 |

* cited by examiner

*Primary Examiner* — Lisa Caputo
*Assistant Examiner* — Jermaine Jenkins
(74) *Attorney, Agent, or Firm* — Paul Davis; Goodwin Procter LLP

(57) ABSTRACT

A pressure transducer is provided that has a transducer body with a rim, a diaphragm that deflects in response to pressure and a sensor bonded to the diaphragm at the rim and at a center of the diaphragm. The sensor detects deflection of the metal diaphragm. The sensor and diaphragm are made of different materials. A thermal expansion difference between the sensor and the diaphragm is accommodated by flexures in the sensor that accept relative motion in a radial direction of the metal diaphragm with little effect on a sensitivity of the silicon structure to motion in an axial direction of the diaphragm.

28 Claims, 6 Drawing Sheets

SILICON SENSING STRUCTURE TO DETECT THROUGH-PLANE MOTION IN A PLANE OF MATERIAL WITH THERMAL EXPANSION SUBSTANTIALLY DIFFERENT FROM THAT OF SILICON

CROSS-REFERENCE TO RELATED APPLICATIONS

This application claims the benefit of U.S. Ser. No. 60/976,206, filed Sep. 28, 2007, which application is fully incorporated herein by reference.

BACKGROUND OF THE INVENTION

1. Field of the Invention

The present invention relates generally to pressure transducers, and more particularly to a high-pressure/high-temperature pressure transducer that senses diaphragm deflection for pressure sensing.

2. Description of the Related Art

A typical pressure transducer includes a pressure sensor that can constitute, e.g., a piezo-sensor that uses the piezoresistive effect or a thin-film pressure sensor having thin-film measurement strips. The pressure sensor is supplied using electrical auxiliary energy in that an electrical voltage is applied to it and it is subjected directly or indirectly to the pressure of a measured medium. The electrical output signal from the pressure sensor changes depending on the effective pressure, the signal being forwarded to a circuit arrangement that, e.g., comprises a bridge circuit and/or adjustable resistances for null measurement, temperature compensation and setting nominal sensitivity. The pressure transducer provides an electrical output signal in the form of an output signal voltage or output signal current that is a measure of the pressure measured.

With pressure sensors with continuing electrical excitation, a portion of the electrical excitation is diverted into a signal channel by some distortion caused by the measured pressure. These may include variable capacitors, variable inductors (including variable transformers), and variable resistors. For reasons of simplicity and ruggedness, variable resistors are most commonly used. Resistive pressure sensors, generally, compare the resistance of a resistor modified by the action of the pressure to the resistance of a similar resistor either unmodified, or modified in the opposite direction by the action of the pressure. The comparison is generally made in a Wheatstone bridge. Strain gages are resistors designed to be changed by strain. Metallic strain gages may be very stable and have very low noise, but will produce a resistance change of only one or two parts per thousand as a practical full scale signal. Semiconductor strain gages may have resistance changes one hundred times that of a metallic strain gage. The greater signal makes their use desirable in environments that are noisy and/or remote from where the signal is used.

Pressure measurement in high temperature environments presents a challenge for the use of semiconductor strain gages (piezoresistors). Most commonly, the medium in which the pressure is to be measured is chemically aggressive. The portion of the transducer touching the medium must be resistant to any change the medium might cause. Almost always, the portion of the transducer touching the medium is a corrosion resistant metal. Metals generally, and particularly corrosion resistant metals, have thermal expansion coefficients in the range of ten to twenty parts per million per degree C. (Special low-coefficient metals are very susceptible to corrosion.) Common semiconductor materials have much lower coefficients of expansion, in the range of two to four parts per million per degree C. Silicon in particular expands about 3.3 ppm/degree C. The difference in expansion over temperature ranges of interest is potentially destructive to semiconductor strain gages, and may impose large undesired signals on them.

There is a need for a corrosion-resistant metallic pressure transducer that incorporates a piezoresistive measuring system.

SUMMARY OF THE INVENTION

Accordingly, an object of the present invention is to provide an improved corrosion-resistant pressure transducer.

Another object of the present invention is to provide a corrosion-resistant pressure transducer that incorporates a piezoresistive measuring system.

A further object of the present invention is to provide a pressure transducer for high temperatures and moderate to high pressures.

Yet another object of the present invention is to provide a pressure transducer that provide accommodation for a change of temperature in the pressure transducer that results in a significant difference between a stressed and an unstressed length of the sensor.

Another object of the present invention is to provide a pressure transducer that achieves a high compliance in only length of a sensor and retains stiffness in thickness and width of the sensor in response to different thermal expansion characteristics of the sensor and an associated diaphragm.

These and other objects of the present invention are achieved in a pressure transducer that has a transducer body with a rim, a diaphragm that deflects in response to pressure and a sensor bonded to the diaphragm at the rim and at a center of the diaphragm. The sensor detects deflection of the metal diaphragm. The sensor and diaphragm are made of different materials. A thermal expansion difference between the sensor and the diaphragm is accommodated by flexures in the sensor that accept relative motion in a radial direction of the metal diaphragm with little effect on a sensitivity of the silicon structure to motion in an axial direction of the diaphragm.

In another embodiment of the present invention, a pressure transducer has a transducer body with a rim and a diaphragm with a thickness that is less than a thickness of the rim. The diaphragm has a central pillar that is coplanar with a shelf of the rim. A sensor is bonded at the central pillar and the rim with the bonds being rigid and non-rotating. The sensor extends from the rim to the pillar. Pressure-induced deflection of the diaphragm induces double-bending in the sensor with an inner end bending down and an outer end bending up. The sensor includes an accommodation structure that provides accommodation in a change of length of the sensor in response to temperature changes and a resulting length change in a body of the sensor. One or more piezoresistors are in the bending areas that produce equal and opposite resistance changes that can be detected in a Wheatstone bridge.

In another embodiment of the present invention, a pressure transducer is provided that has a transducer body with a rim, a diaphragm with a central pillar that is coplanar with a shelf of the rim, and a sensor with a center portion. The sensor is bonded at the central pillar and the rim with the bonds being rigid and non-rotating. The sensor includes an accommodation structure positioned at an inflection point to provide accommodate in a change of length of the sensor in response to thermal mismatch. The sensor extends from the rim to the pillar and pressure-induced deflection at a center of the diaphragm induces a distortion of the sensor with a geometry that approximates or is an S-shape. The sensor bends in an upward direction away from the diaphragm at the rim, and bends in a downward direction towards the diaphragm at the center portion, with the inflection point of neutral bending between the rim and the center portion. One or more piezoresistors are in the bending areas.

DETAILED DESCRIPTION OF THE PREFERRED EMBODIMENT

The present invention provides a pressure transducer for high temperatures and moderate to high pressures. A sensor is provided which can be directly mounted on a diaphragm of a material, including but not limited to, metals such as stainless steel, other corrosion-resistant metal, ceramics and the like The pressure transducer of the present invention can function at temperatures as described hereafter.

In one embodiment of the present invention, a sensor is mounted between a lightly stressed side wall supporting a diaphragm and a co-planar boss at a center of the diaphragm. A pressure applied across the diaphragm deflects the center of the diaphragm, carrying with it the end of the sensor bonded to the boss. The sensor produces a signal in response to this displacement of one end relative to the other end.

Any piezoresistive material can be used where there is a separation of the bulk and gage functions. The sensor can be made of a variety of different materials, including but not limited to Si, silicon on oxide, silicon carbide and the like. Silicon can be used for with environments with moderate temperature ranges up to about 200 degrees C. Silicon on oxide, e.g., SOI, can be used for environments with temperatures up to about 300 degrees C. Silicon carbide, both for the gage and the conductor, can be utilized for environments for temperatures up to about 400 degrees C., and the like. In one embodiment, the massive parts are non-conducing carbide. The diaphragm can be made of a variety of materials including but not limited to, corrosion-resistant metals, ceramics such as alumina, and the like. In one embodiment, the diaphragm is made of crystalline alumina and supporting structures are polycrystalline.

With the present invention, a change of temperature in the pressure transducer device results in a significant difference between the unstressed length of the sensor, such as silicon, and a radial distance on the diaphragm, between the location where the sensor is bonded at the center and where the sensor is bonded at the rim of the diaphragm. If the sensor were a simple, prismatic shape it would be highly stressed by this change of length. In the present invention this change of length is accommodated by one or more "soft" structures, e.g., structures that are capable of movement, along the length of the sensor, to produce relatively low stresses at the areas of the sensor where measurement is to be made.

Figure 1A:
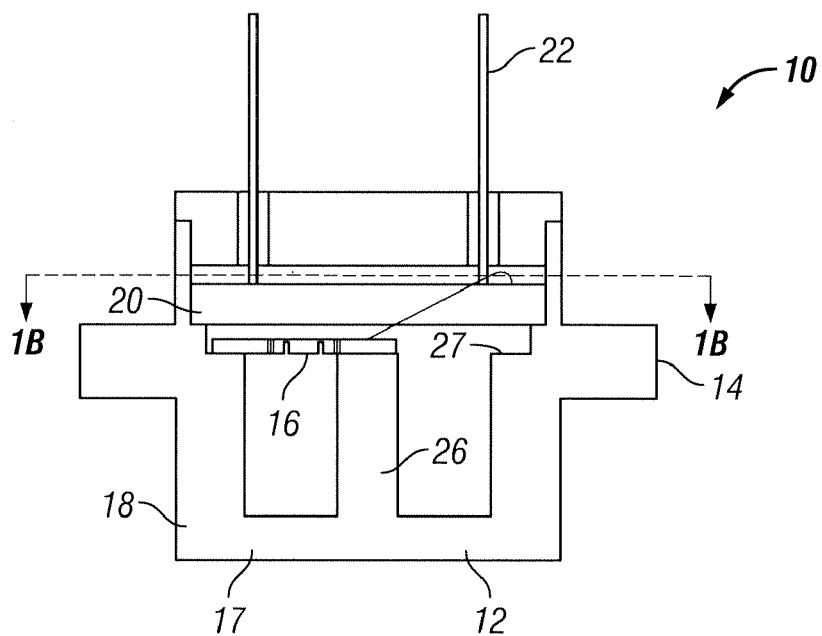
FIG. 1(a) is a cross-section view of one embodiment of the present invention, showing a flush-mount transducer with a diaphragm that deflects in response to pressure.
Figure 1B:
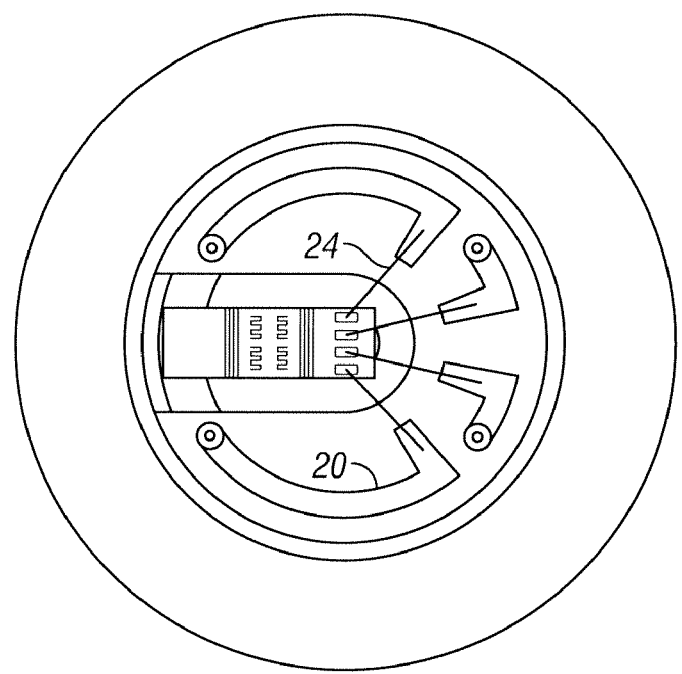
FIG. 1(b) is a cross sectional view of FIG. 1(a).

In one embodiment of the present invention, illustrated in FIGS. 1(a) and 1(b), the high-pressure/high-temperature pressure transducer 10 has a flush-faced stainless steel diaphragm 12, a thick rim 14 and a silicon sensor 16 bonded to a back side of the diaphragm 12. It will be appreciated that other materials can be utilized for both the diaphragm 12 and sensor 16. As non-limiting examples, the bonds between the diaphragm 12 and sensor 16 can be made a, solder glass bond, solder bond, very high temperature resin, and the like. A front side 17 of the diaphragm 12 is the surface exposed to the medium that is to be measured for pressure, and the back side of the diaphragm 12 is the one that is medium protected. The transducer 10 includes a transducer body 18 that can include the rim 14, a pc board 20, lead wires 22, and conductive traces 24 on the pc board 20. The pc board 20 provides a transition between fine leads of the sensor 16 and more substantive lead wires 22 to the outside world.

Figure 5A:
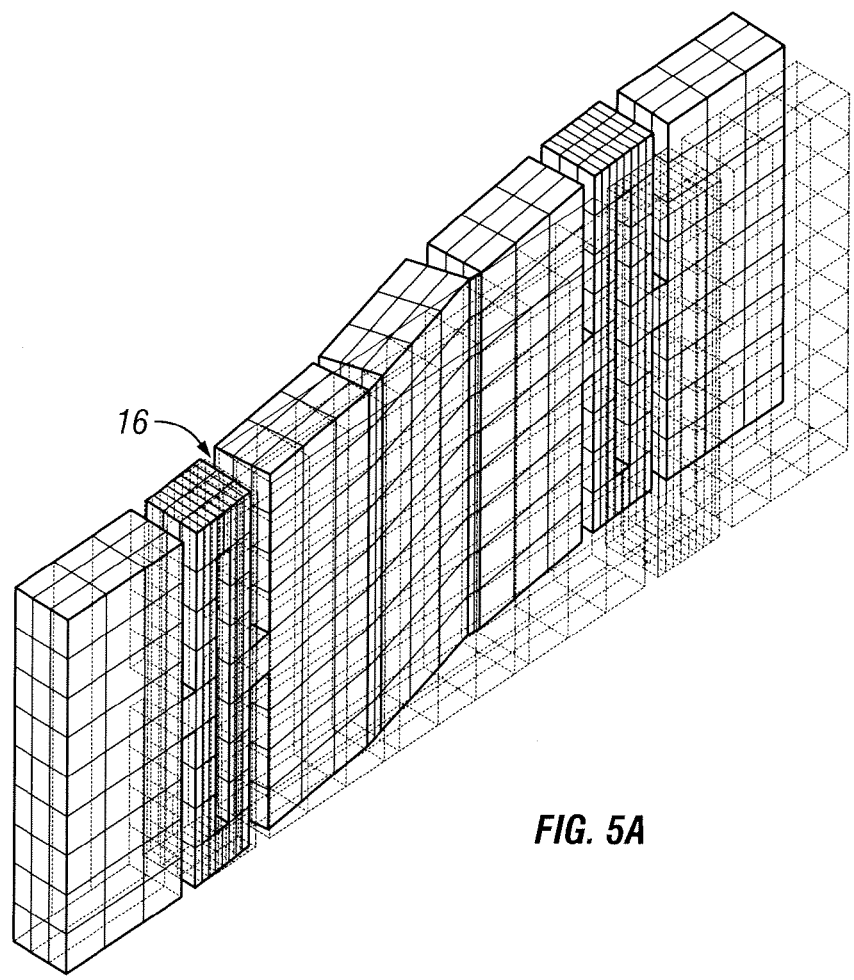

In this embodiment, the diaphragm 12 has a central pillar or boss 26 that is co-planar with a shelf 27 on the rim 14, as illustrated in FIG. 5(a). The sensor 16 is bonded to both, and extends from the rim 14 to the pillar 26. The bonds can be rigid and non-rotating relative to the transducer body 18 that includes the rim 14. Pressure-induced diaphragm deflection can induce double-bending in the sensor with a sensor inner end bending down, and a sensor outer end bending up as illustrated in FIG. 5(a).

Figure 2B:
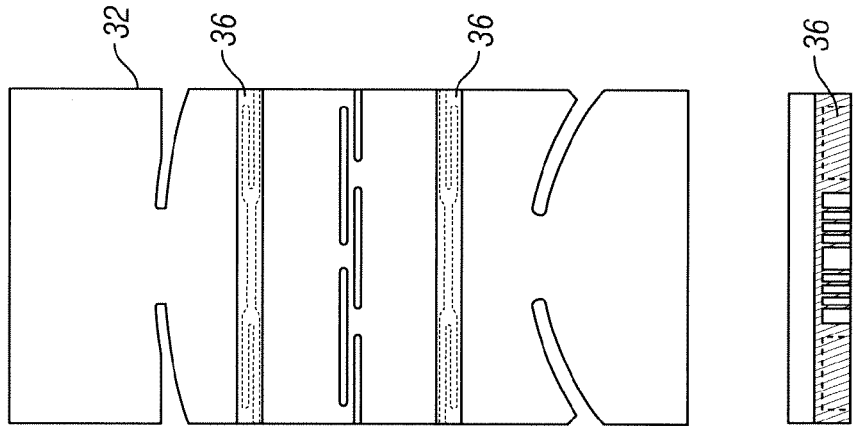
FIGS. 2(a) and 2(b) illustrate another embodiment of a pressure transducer of the present invention showing a rim and pillar where the sensor is bonded as indicated only by lines in the plan view.
Figure 2A:
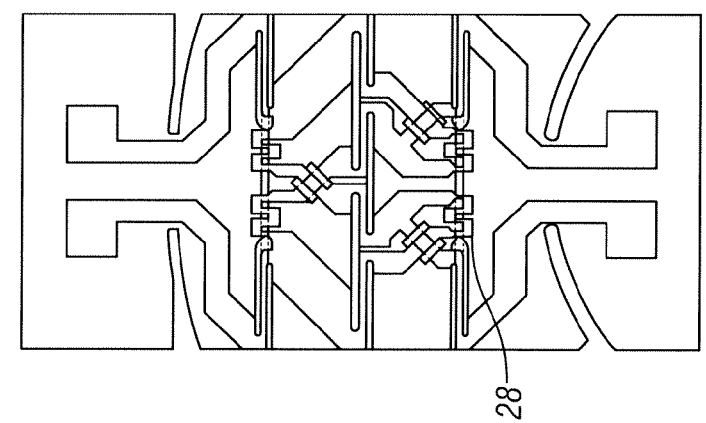

Piezoresistors 28 are positioned in an interior of the transducer body 18, shown in FIGS. 2(a) and 2(b), in the bending areas of the sensor 16 to produce equal and opposite resistance changes. These resistance changes are detected in a Wheatstone bridge. In one embodiment, the bending areas with the piezoresistors 28 are made sufficiently soft such that the bending thickness is no more than 0.10 of a bending stiffness of the bulk material of the sensor 16. In another embodiment, the bending thickness is no more than 2% of the bulk material of the sensor 16. With a folding or bellowing effect of one section of the sensor 16 relative to an opposite section, the present invention achieves a high compliance in only length of the sensor 16 and retains stiffness in thickness and width of the sensor 16. The present invention provides for an accommodation of the expansion difference bend in response to the pressure-induced deflection, and most of the bending occurs in bending areas under the piezoresistors 28. In one embodiment, the bending or deflection is 2-20 microns of deflection of the moving part of the sensor 16 that is the portion attached to the diaphragm 12. The non-moving part of the sensor 16 is attached to the non-moving part of the transducer body 18.

Figure 5B:
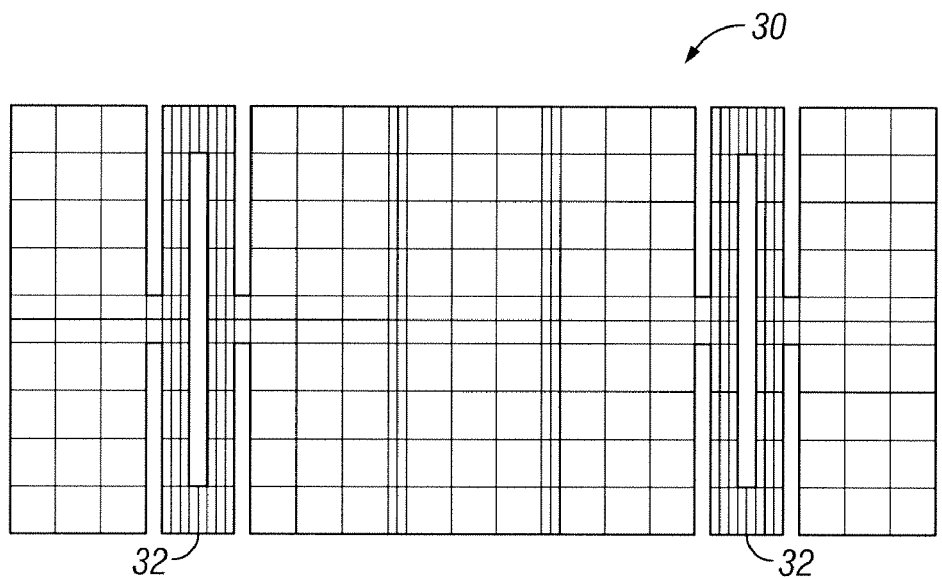

FIGS. 2(a) and 2(b) illustrate another embodiment of the present invention. In this embodiment, the rim 14 and pillar 26, where the sensor is bonded, are indicated only by lines in the plan view. The pressure-induced motion of the center of the diaphragm 12 approximates or is an S-shaped distortion of the sensor 16, e.g., between the moving and the reference portions of the transducer body 18. At the rim 14, the sensor 16 is bent upward, away from the diaphragm 12. At the center, it is bent downward, toward the diaphragm 12. Between these two bent areas of sensor 16 is an "inflection point" 30, FIG. 5(b), where the bending is neutral. In the FIGS. 2(a) and 2(b) embodiment, an accommodation structure 32 is provided as part of the sensor 16. The accommodation structure accommodates a change of length of the sensor 16 that results from temperature changes and the resulting length change in the body of the sensor 16. In one embodiment, the accommodation structure 32 is placed at the inflection point 30 to accommodate the change of length of the sensor 16. This is a result from the temperature changes of materials of different thermal expansions. The present invention accommodates for this and includes an accommodation structure 32 in the sensor 16. Using the accommodation structure 32, the accommodation makes little effect on the bending at either end of the sensor 16.

Figure 4:
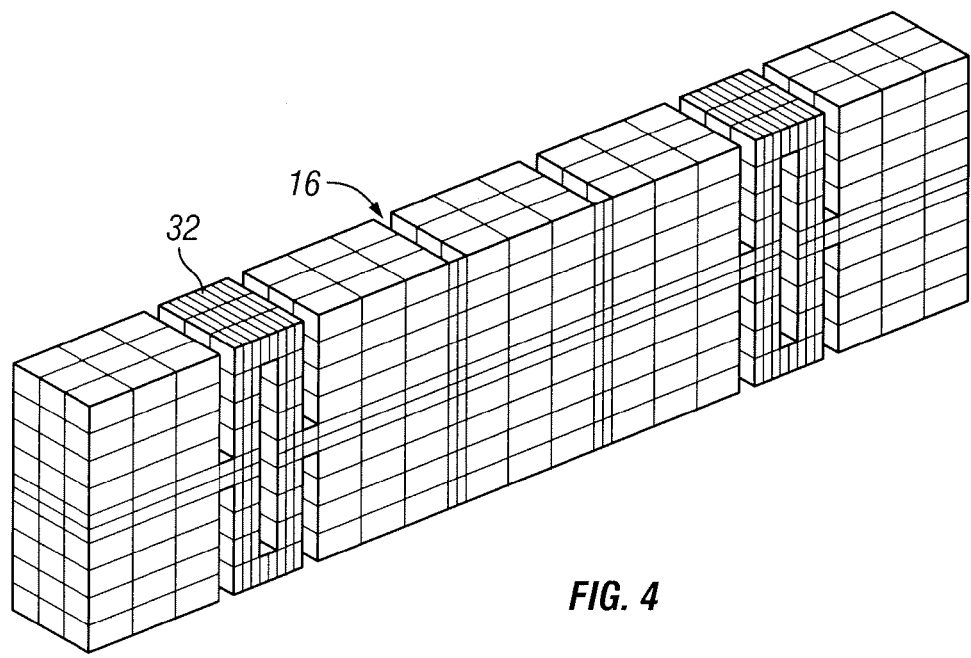
FIGS. 4, 5(a) and 5(b) illustrate the stress distribution on the sensor under bending in one embodiment of a pressure transducer of the present invention.

In one embodiment, the accommodation structure 32 is a thin free standing structure within the sensor 16, where softness, e.g., move ability is desired, as illustrated in FIG. 4. In one embodiment, the accommodation structure 32 is one or more blades. The blades can be orthogonal to a radial direction of the transducer body in that the sensor is aligned radially on the transducer body 18, e.g., radial is movement of the sensor 16 relative to the transducer body 18 in a radial direction. There is an attachment between a site on the interior and a site on the rim end. One or more accommodation structures 32 can be provided. The blades are sufficiently compliant in order to provide accommodation to the length change of the moving part of the sensor 16. Each blade is attached to a site near the center of the width of the sensor 16, and at a site near the rim of the sensor 16. In another embodiment, each blade is attached to the edge of the width, and to a site interior of the sensor 16. In the direction providing accommodation, the blades bend in the direction of their thickness, appearing soft in that they are able to accommodate for change in length. In the direction of the forces bending the ends of the sensor 16, the blades experience in-plane shear relative to their own planes. and appear stiff.

Figure 3:
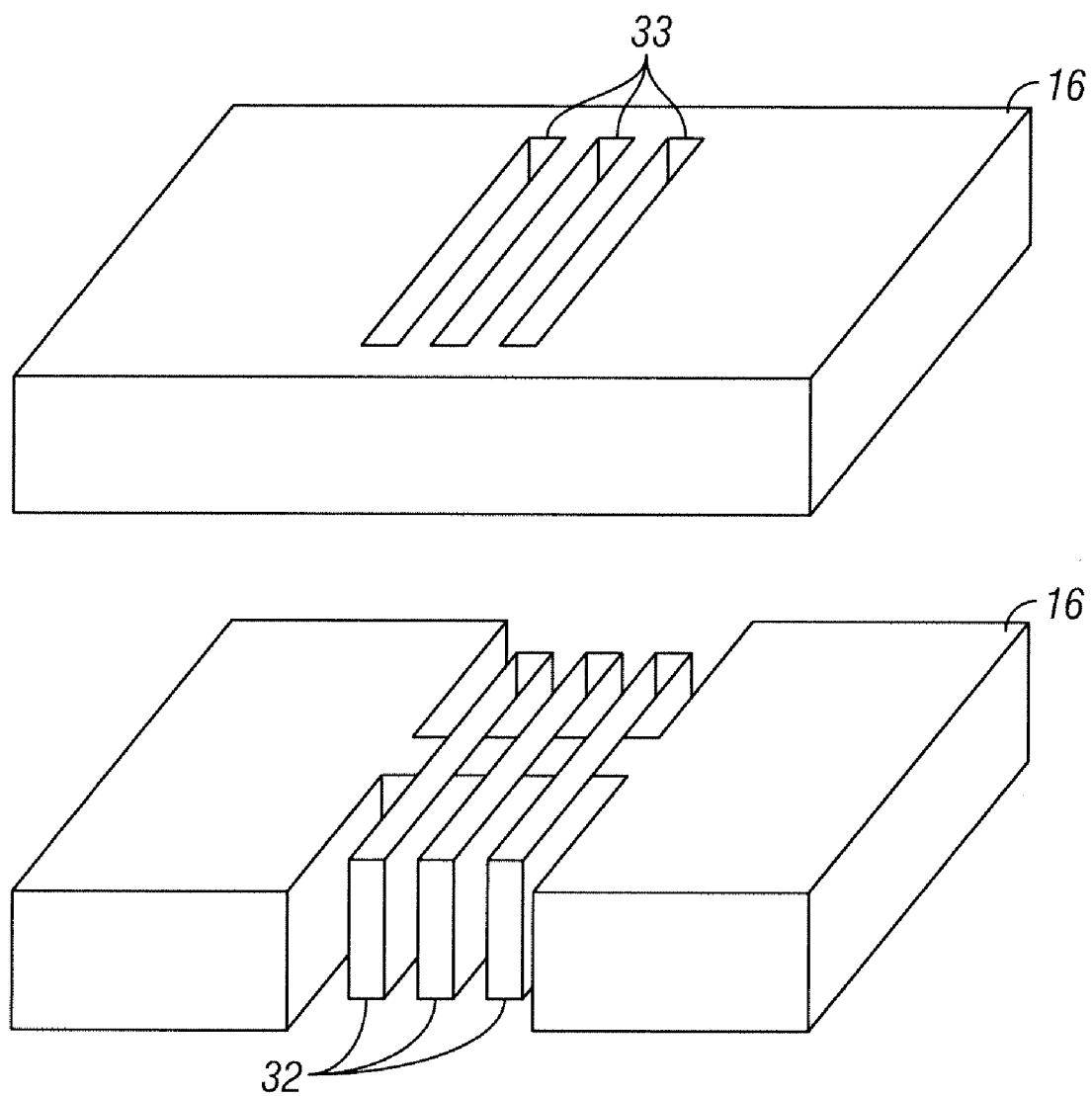
FIG. 3 illustrates the creation of etch through holes and etch free springs for one embodiment of the present invention.

Referring now to FIG. 3, the accommodation structure 32 is placed toward one end of the sensor 16, between the two bending areas and one of the bonded ends of the sensor 16. In this embodiment, it is difficult to induce bending in the bending area nearer to the accommodation structure 32.

In this embodiment, the thickness of the blades is adjusted to maintain a relative bend stiffness compared to the bend stiffness of the entire sensor 16. In comparison, in the FIGS. 2(*a*) and 2(*b*) embodiment, the bend thickness of the blades is not important because it is placed at the inflection point as illustrated in FIGS. 2 and 5.

Bonding the ends of the sensor 16 to the center and rim of the diaphragm 12 subjects these ends to the full distortion of the thermal expansion difference. In this embodiment, the sensor 16 is arranged to minimize the effect of this distortion on the piezoresistors 28. As a non-limiting example, the range of this distortion can be about 1-5% of a false signal induced by the thermal effect.

Figure 2A:
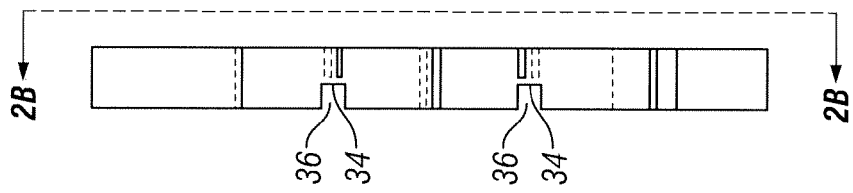

As illustrated in FIG. 2(*a*), flexible structures 34 are provided that are groove bottoms and where gages 36 are positioned to measure flexing of the flexible structures 34. In this embodiment, the gages 36 are on the surface above the flexible structure 34 in the sensor 16. This is where the measurement is taken. An accommodating expansion is between the bonded ends and the piezoresistors 28.

In FIGS. 2(*a*) and 2(*b*), the width if the sensor 16 is narrowed to reduce the transmission of distortion from the ends to the bending sections. The sensing part of the sensor 16 is less responsive to bonding down strains when the ends are tied to their sites on the transducer body 18. In one embodiment, only one piezoresistor 28 is well isolated, and the other is defended only by distance of the bending section from the bond at the end. Defended means isolation of one type of strain from another, and ignoring radial deflection caused by thermal deflection. In this way, only axial deflection of the transducer 10 is measured.

Various manufacturing means can be used to make the flexible structures to accommodate the expansion difference. By way of illustration, and without limitation, the FIG. 3 embodiment illustrates one way of making the accommodation structure 32. In this embodiment, etched through holes 33 are made in a specific direction in (111) silicon. A first slot is etched through a wafer, which is the body of the sensor 16, in a material such as silicon, (with vertical (111) walls in a (110) wafer). The walls of the wafer are doped with enough boron, with a large enough P type doping to make the silicon resistant to the dopant selective etch. This is a constraint for one embodiment of the present invention. It will be appreciated that other materials can be used with other etching parameters and etching technologies, and with enough depth to make them resistant to a doping-selective etch. Parallel slots can be etched to expose the thin blades of etch-resistant silicon. In will appreciated that this example is only preferred for this particular embodiment and illustrates one method for making the blade structure.

For the FIG. 1(*a*) and FIG. 1(*b*) embodiment, parallel slots can be etched through the wafer, masked on both sides of a silicon wafer, again with vertical (111) walls in a (110) wafer. The slots are separated by a desired blade thickness and overlap by a desired blade length.

For the FIGS. 2(*a*) and 2(*b*) embodiment, the blades can be created by deep reactive ion etching (DRIE) of the parallel, overlapping slots It will be appreciated that each of these methods can be utilized for the embodiments of FIGS. 1(*a*) through FIG. 3.

FIG. 5(*a*) illustrates the stress distribution on the sensor 16 under bending, which is the normal operating mode. High stresses are seen in the gages 36.

Figure 6:
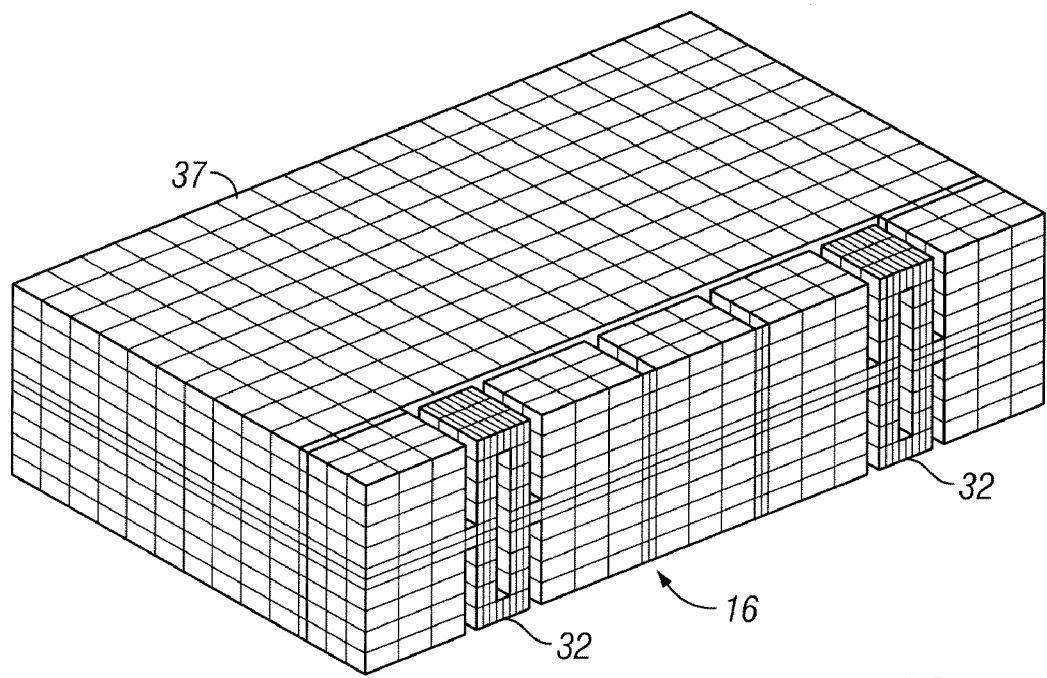
FIGS. 6 and 7 illustrate an embodiment of the present invention with the sensor coupled to a block.
Figure 7:
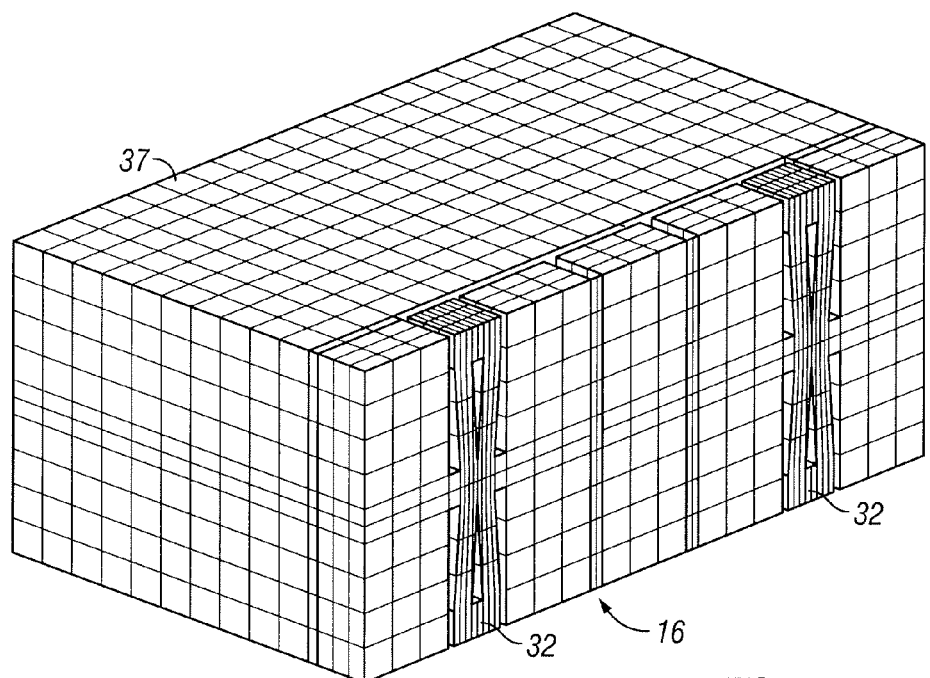

FIGS. 6 and 7 illustrate how the accommodation structure 32 can deform in order to allow the sensor 16 to absorb axial stresses. FIGS. 6 and 7 show a model where the sensor 16 is attached to a stainless steel block 37 at 300 degrees C. This approximates the situation where a silicon sensor 16 is bonded to the transducer body 18. FIG. 6 illustrates the deflections of the accommodation structure 32 as a silicon sensor 16 is attached to a block 37 of high expansion material for demonstration of the accommodation function, as if it were attached to a sculpted transducer body 18, with cool down to ambient temperature.

Figure 8:
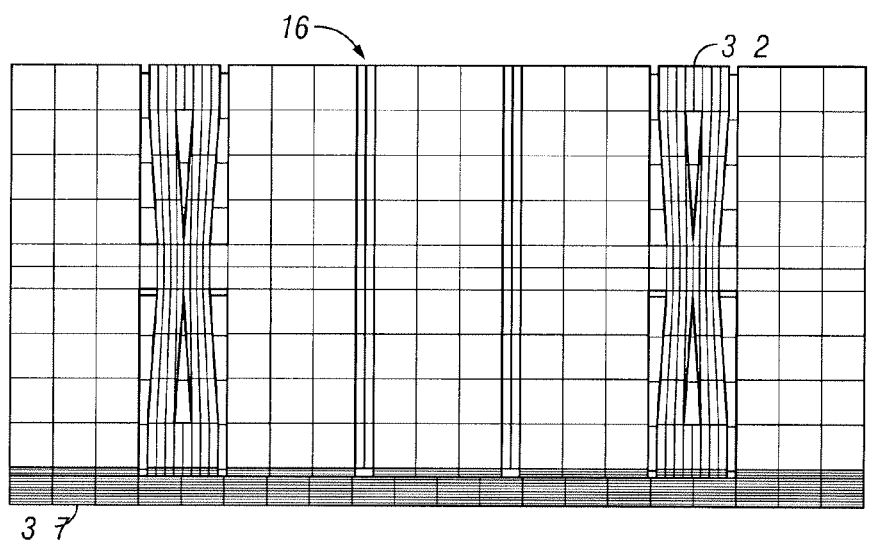
FIG. 8 illustrates one embodiment of the present invention showing stress distribution with the sensor mounted to a steel block after cool down.

FIG. 8 illustrates the stress distribution of the silicon sensor 16 attached to the block 37 after cooling down to ambient temperature. The stress is in the folding or bellowing effect of one section of the sensor 16 relative to an opposite section, with virtually no stress at the gages 36.

A challenge is presented with respect to differences in thermal expansion characteristics of a silicon sensor 16 and the a steel diaphragm 12. This challenge can be solved in a variety of ways, including but not limited to the use of, solder glass, an eutectic gold/silicon and the like. With the solder glass approach, a slurry of glycol and glass powder is used. The slurry can be applied like glue and a die is set in place. The glycol carrier is evaporated at 250 degrees C., and then the glass is melted at 440 degrees C. After the glass cures it is suitable for temperatures up to about 700 degrees C.

In another embodiment, a gold/silicon solder is used to plate both the die and the stainless steel with gold. The gold silicon solder melts at 270 degrees C. and absorb more gold from the plating changing the melting point of the mixture to above 400 degrees C.

The temperature expansion mismatch between the sensor 16 and the diaphragm 12 may cause a severe compressive stress on the gages 36. The piezoresistors 28 can serve as strain sensors. The piezoresistors 28 with the accommodation structure 32 can be deflection sensors. The deflection sensors is relatively unresponsive to thermal expansive mismatch. Accommodation structures 32 in the form of stress relief springs, illustrated in FIGS. 2(a), 2(b), 3, 5(a) and 5(b) can be used to overcome the expansion mismatch. For operating at high temperature, gages 36 can be employed that are oxide bonded or direct bonded. Use of the stress relief springs makes the sensor 16 very limp in the direction of strain due to expansion mismatch between the diaphragm 12 and the sensor 16, and very stiff in the direction of design strain.

In one embodiment, the stress relief springs are made by only two mask steps.

Expected variations or differences in the results are contemplated in accordance with the objects and practices of the present invention. It is intended, therefore, that the invention be defined by the scope of the claims which follow and that such claims be interpreted as broadly as is reasonable.

What is claimed is:

1. A pressure transducer, comprising:
    a transducer body with a rim;
    a diaphragm having a thickness that is less than a thickness of the rim, the diaphragm having a central pillar that is coplanar with a shelf of the rim;
    a sensor bonded at the central pillar and the rim with the bonds being rigid and non-rotating, the sensor extending from the rim to the pillar, wherein pressure-induced deflection of the diaphragm induces double-bending in the sensor with an inner end bending down and an outer end bending up, the sensor including an accommodation structure that provides accommodation in a change of length of the sensor in response to temperature changes and a resulting length change in a body of the sensor; and
    one or more piezoresistors in the bending areas that produce equal and opposite resistance changes that can be detected in a Wheatstone bridge.

2. The pressure transducer of claim 1, wherein the accommodation structure is one or more thin free standing structures within the sensor.

3. The pressure transducer of claim 2, wherein the thin free standing structures are blades.

4. The pressure transducer of claim 1, wherein the sensor produces a signal in response to displacement of one sensor end relative to an opposing sensor end.

5. The pressure transducer of claim 1, wherein the sensor is made of a material selected from at least one of, Si, silicon on oxide and silicon carbide.

6. The pressure transducer of claim 1, wherein the diaphragm is made of a material selected from at least one of, metals, corrosion-resistant metals and ceramics.

7. The pressure transducer of claim 1, wherein diaphragm is made of crystalline alumina and supporting structures are polycrystalline.

8. The pressure transducer of claim 1, wherein a change of temperature in the pressure transducer results in a difference between an unstressed length of the sensor and a radial distance on the diaphragm between a location where the sensor is bonded at a center of the diaphragm and where the sensor is bonded at the rim.

9. The pressure transducer of claim 1, wherein the one or more piezoresistors positioned in bending areas of the sensor to produce equal and opposite resistance changes.

10. The pressure transducer of claim 9, wherein the bending areas with the piezoresistors are made soft by making the piezoresistors sufficiently thin to provide that even though a folding or bellowing effect of the sensor accommodating an expansion difference bend in response to pressure-induced deflection, a majority of the bending occurs in bending areas under the piezoresistors.

11. The pressure transducer of claim 1, further comprising:
    one or more flexible structures and gages to measure flexing of the flexible structures.

12. The pressure transducer of claim 1, wherein parallel slots are etched through a (110) Si wafer that forms a silicon sensor, masked on both sides of the wafer with vertical (111) walls in the wafer.

13. The pressure transducer of claim 1, wherein a thermal expansion difference between the sensor and the diaphragm is accommodated by flexures in the sensor that accept relative motion in a radial direction of the metal diaphragm with little effect on a sensitivity of the silicon structure to motion in an axial direction of the diaphragm.

14. A pressure transducer, comprising:
    a transducer body with a rim;
    a diaphragm with a central pillar that is coplanar with a shelf of the rim;
    a sensor with a center portion, the sensor being bonded at the central pillar and the rim with the bonds being rigid and non-rotating, the sensor including an accommodation structure positioned at an inflection point to provide accommodate in a change of length of the sensor in response to thermal mismatch, the sensor extending from the rim to the pillar and pressure-induced deflection at a center of the diaphragm induces a distortion of the sensor with a geometry that approximates or is an S-shape, the sensor being bent in an upward direction away from the diaphragm at the rim, and bent in a downward direction towards the diaphragm at the center portion with the inflection point of neutral bending between the rim and the center portion; and
    one or more piezoresistors in the bending areas.

15. The pressure transducer of claim 14, wherein at the inflection point the accommodation structure has little effect on bending at either end of the sensor.

16. The pressure transducer of claim 15, wherein the accommodation structure is one or more thin free standing structures within the sensor.

17. The pressure transducer of claim 16, wherein the thin free standing structures are blades.

18. The pressure transducer of claim 14, wherein the sensor produces a signal in response to displacement of one sensor end relative to an opposing sensor end.

19. The pressure transducer of claim 14, wherein the sensor is made of a material selected from at least one of, Si, silicon on oxide and silicon carbide.

20. The pressure transducer of claim 14, wherein the diaphragm is made of a material selected from at least one of, metals, corrosion-resistant metals and ceramics.

21. The pressure transducer of claim 14, wherein diaphragm is made of crystalline alumina and supporting structures are polycrystalline.

22. The pressure transducer of claim 14, wherein a change of temperature in the pressure transducer results in a difference between an unstressed length of the sensor and a radial distance on the diaphragm between a location where the sensor is bonded at a center of the diaphragm and where the sensor is bonded at the rim.

23. The pressure transducer of claim 14, wherein the one or more piezoresistors positioned in bending areas of the sensor to produce equal and opposite resistance changes.

24. The pressure transducer of claim 14, further comprising:
   one or more flexible structures and gages to measure flexing of the flexible structures.

25. The pressure transducer of claim 14, wherein a change of temperature in the pressure transducer results in a difference between an unstressed length of the sensor and a radial distance on the diaphragm between a location where the sensor is bonded at a center of the diaphragm and where the sensor is bonded at the rim.

26. The pressure transducer of claim 14, wherein the accommodation structure is positioned toward one end of the sensor between the two bending areas and one of the bonded ends of the sensor.

27. The pressure transducer of claim 14, wherein bonds at the ends of the sensor subjects ends of the sensor to full distortion of a thermal expansion difference.

28. The pressure transducer of claim 14, wherein the sensor is positioned to minimized an effect of distortion on the one or more piezoresistors.

* * * * *